(12) United States Patent
Anselmo et al.

(10) Patent No.: US 9,073,025 B2
(45) Date of Patent: Jul. 7, 2015

(54) SYSTEM AND METHOD FOR CATALYST LOADING/MIXING

(75) Inventors: Mark Anselmo, Arvada, CO (US); Derek Bridgford, Broken Arrow, OK (US); Nick Cozzi, Golden, CO (US); Sergio Mohedas, Westminster, CO (US); Matt Greer, Aurora, CO (US); Paul Morton, Brighton, CO (US)

(73) Assignee: RES USA, LLC, Westminster, CO (US)

( * ) Notice: Subject to any disclaimer, the term of this patent is extended or adjusted under 35 U.S.C. 154(b) by 1666 days.

(21) Appl. No.: 12/207,880

(22) Filed: Sep. 10, 2008

(65) Prior Publication Data

US 2009/0068073 A1    Mar. 12, 2009

Related U.S. Application Data

(60) Provisional application No. 60/971,280, filed on Sep. 11, 2007.

(51) Int. Cl.
*B01J 23/00* (2006.01)
*B01F 13/02* (2006.01)
(Continued)

(52) U.S. Cl.
CPC ............ *B01F 13/0255* (2013.01); *B01J 23/745* (2013.01); *B01J 3/004* (2013.01); *B01J 8/003* (2013.01); *B01J 8/0035* (2013.01); *B01J 8/004* (2013.01); *B01J 8/22* (2013.01); *B01J 2208/00141* (2013.01); *B01J 2208/00539* (2013.01); *B01J 2208/0061* (2013.01); *B01J 2208/00752* (2013.01); *B01J 2208/00769* (2013.01); *B01J 2219/185* (2013.01); *B01J 2219/1946* (2013.01); *C10G 2/343* (2013.01)

(58) Field of Classification Search
CPC ........... B01J 23/745; B01J 23/85; B01J 8/003
USPC .................. 502/66, 222, 229, 314, 316, 325; 422/219
See application file for complete search history.

(56) References Cited

U.S. PATENT DOCUMENTS

| | | | |
|---|---|---|---|
| 2,930,604 A | 3/1960 | Thornhill | |
| 3,008,809 A | 11/1961 | Martinez | |

(Continued)

FOREIGN PATENT DOCUMENTS

| | | | | |
|---|---|---|---|---|
| GB | 896786 A | 5/1962 | | |
| SU | 510254 | * 5/1976 | ............. | B01D 53/18 |

OTHER PUBLICATIONS

International Search Report, International Application No. PCT/US2008/075836, dated Jan. 21, 2009.

(Continued)

*Primary Examiner* — Matthew E Hoban
*Assistant Examiner* — James Fiorito
(74) *Attorney, Agent, or Firm* — Timothy S. Westby; Porter Hedges LLP

(57) ABSTRACT

A catalyst loading system comprising: a vessel comprising at least one gas distribution nozzle at or near the bottom of the vessel, a top fluid distributor located at or near the top of the vessel, a catalyst inlet through which catalyst is introduced into the vessel, a first contact point at which catalyst introduced into the vessel first contacts the contents of the vessel, and a discharge outlet whereby catalyst exits the vessel. Methods of preparing catalyst slurry for introduction into a downstream reactor or in-situ activation within the vessel utilizing the catalyst loading system are also disclosed.

29 Claims, 5 Drawing Sheets

(51) Int. Cl.
  *B01J 3/00* (2006.01)
  *B01J 8/00* (2006.01)
  *B01J 8/22* (2006.01)
  *C10G 2/00* (2006.01)
  *B01J 23/745* (2006.01)

(56) References Cited

U.S. PATENT DOCUMENTS

| | | | |
|---|---|---|---|
| 4,433,707 | A | 2/1984 | Farnham |
| 4,664,778 | A | 5/1987 | Reinkemeyer |
| 5,077,093 | A | 12/1991 | Baumgartner et al. |
| 5,098,690 | A | 3/1992 | Koves |
| 6,010,620 | A | 1/2000 | Myers et al. |
| 2005/0182145 | A1* | 8/2005 | Mohedas et al. ............. 518/716 |

OTHER PUBLICATIONS

International Search Report and Written Opinion dated Jan. 21, 2009 for corresponding PCT Patent Application No. PCT/US2008/075836 (5pgs.).
Canadian Office Action dated Jun. 20, 2011 for corresponding Canadian Patent Application No. 2,699,784 (2 pgs.).
Australian Office Action dated Mar. 1, 2012 for corresponding Australian Patent Application No. 2008299003 (3 pgs.).
Chinese Office Action dated Apr. 1, 2012 for corresponding Chinese Patent Application 200880106662.X; 12 pages.
Supplementary European Search Report dated Dec. 6, 2010 issued in corresponding Application No. 08830792.1.
Eurasian Examination Report dated Feb. 25, 2014 for corresponding Eurasian Application No. 2302/DELNP/2010 (2 pgs.).
Chinese Office Action dated Feb. 16, 2013 for corresponding Chinese Application No. 200880106662.X (12 pgs.).

* cited by examiner

SYSTEM AND METHOD FOR CATALYST LOADING/MIXING

CROSS-REFERENCE TO RELATED APPLICATIONS

This application claims the benefit under 35 U.S.C. §119 (e) of U.S. Provisional Patent Application No. 60/971,280 filed Sep. 11, 2007, the disclosure of which is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates generally to introduction of a fluidized catalyst to a reactor system. More specifically the invention relates to a system and process of wetting and fluidizing catalyst in a loading vessel prior to transfer of fluid media and catalyst (i.e. catalyst slurry) to the reactor, thereby minimizing loss of catalyst through process vent(s) as well as minimizing attrition since the invention leads to avoid use of mechanical devices (e.g. pumps, mechanical stirring, etc.).

2. Description of the Related Art

Present methods for loading catalyst into reactors typically utilize encapsulation of catalyst into wax prior to introduction to the main reactor. Such a procedure requires an outside vendor to mix the products, and is often rather costly. The wax used for encapsulation is generally very expensive and additional costs are incurred to transport the wax to the catalyst production site and to transport the prepared catalyst from this site to the plant location.

Accordingly, there exists a need for a system and method for mixing catalyst with a base fluid and introducing the catalyst slurry into a main reactor. It is desirable for such a system and method to reduce personnel exposure, reduce catalyst loss and degradation, provide for efficient and uniform mixing of catalyst with base fluid, and minimize catalyst degradation and/or attrition.

SUMMARY

Herein disclosed are a system and method for loading catalyst into a reactor. The reactor may be a main reactor in which the catalyst catalyzes a reaction or an activation reactor in which the catalyst is activated prior to its use as a catalyst. In embodiments of the system and method, the reactor is selected from the group consisting of Fischer-Tropsch reactors and activation reactors in which catalyst is activated prior to subsequent use as a Fischer-Tropsch catalyst.

In embodiments, the system and/or method of the present disclosure are used to load catalyst comprising particles and a majority of the catalyst particles have a particle size in the range of from about 1 μm to about 200 μm. In some embodiments, the system or the method are used to load catalyst particles, a majority of which have a particle size in the range of from about 10 μm to about 150 μm. The catalyst may be a FT catalyst with these size ranges.

In embodiments, the system and method are used to load catalyst particles comprising at least one metal selected from the group consisting of iron, cobalt, and combinations thereof. The catalyst may be a FT catalyst.

Herein disclosed is a catalyst loading system comprising: a vessel comprising at least one gas distribution nozzle at or near the bottom of the vessel, a top fluid distributor located at or near the top of the vessel, a catalyst inlet through which catalyst is introduced into the vessel, a first contact point at which catalyst introduced into the vessel first contacts the contents of the vessel, and a discharge outlet whereby catalyst slurry exits the vessel. The vessel may further comprise temperature control apparatus whereby the contents of the vessel may be maintained at a desired temperature. The vessel may be a catalyst activation reactor, a catalytic reactor, or both.

In embodiments, the first contact point is located at a level below the level of the top fluid distributor. In some embodiments, the top fluid distributor is a liquid distributor. In embodiments, the top fluid distributor comprises a plurality of distribution points or nozzles. In some embodiments, the top fluid distributor comprises at least 8 nozzles. In embodiments, the system further comprises a bottom distributor comprising the at least one gas distribution nozzle. In embodiments, the bottom distributor is a gas distributor. In embodiments, the bottom distributor comprises at least 8 distribution points or nozzles.

In embodiments, the system further comprises at least one level indicator. The at least one level indicator may be selected from the group consisting of differential pressure switches and liquid level switches. The system may further comprise at least one gas purge nozzle at or near the bottom of the vessel for facilitating nozzle and/or valve flushing. The gas purge nozzle may be in fluid communication with the vessel discharge outlet.

In embodiments, the system further comprises a loading hopper, an exit of the loading hopper in fluid communication with the catalyst inlet of the vessel. In embodiments, the loading hopper is positioned above the vessel. In embodiments, the loading hopper further comprises a gas fluidization inlet. The loading hopper may further comprise at least one level monitor and/or at least one weight monitor. The loading hopper may further comprise at least one gas inlet for loading hopper pressurization, fluidization of loading hopper contents, or both. The system may comprise at least three differential switches and at least two level switches. In embodiments, the loading hopper further comprises at least one solenoid valve or flow control device for intermittently allowing catalyst to exit the loading hopper via the loading hopper exit.

The catalyst loading system may be used to load catalyst particles, a majority of which have a particle size in the range of from about 1 μm to about 200 μm. A majority of the catalyst particles may have a particle size in the range of from about 10 μm to about 150 μm.

In embodiments, the discharge outlet whereby catalyst slurry exits the vessel is in fluid communication with a reactor selected from the group consisting of Fischer-Tropsch reactors and activation reactors in which catalyst is activated prior to subsequent use as a catalyst for Fischer-Tropsch reactions. In embodiments, the system is used for loading catalyst comprising at least one metal selected from the group consisting of iron, cobalt, and combinations thereof.

Herein disclosed is also a method of preparing catalyst slurry, the method comprising: introducing base fluid into a vessel comprising at least one gas distribution nozzle at or near the bottom of the vessel, a top fluid distributor located at or near the top of the vessel, a catalyst inlet through which catalyst is introduced into the vessel, a first contact point at which catalyst introduced into the vessel first contacts the contents of the vessel, and a discharge outlet whereby catalyst exits the vessel; the vessel in fluid communication with a loading hopper, the loading hopper comprising a loading hopper exit in fluid communication with the catalyst inlet of the vessel; and at least one gas inlet whereby the loading hopper may be pressurized; introducing catalyst into the loading hopper; and transferring the catalyst into the vessel by pressurizing the loading hopper to a pressure greater than the pressure of the vessel, by gravity, or by a combination thereof. The base fluid may be a liquid at room temperature; or the base fluid may be a solid at room temperature and the vessel may further comprise temperature control apparatus whereby the base fluid is maintained in a flowable form within the vessel. In embodiments of the method, the method further comprises spraying base fluid via the top distributor onto catalyst during transfer of catalyst from the loading hopper to the vessel. The top fluid distributor may comprise nozzles to direct the spray of base fluid onto the catalyst.

The method may further comprise mixing the vessel contents by introducing gas via the at least one gas distribution nozzle. The method may further comprise transferring the catalyst from the vessel to a reactor. In embodiments, the method further comprises spraying the mixed catalyst slurry with base fluid via the top distributor during transfer of catalyst from the vessel to the reactor. In embodiments, the reactor is a fluidized bed catalytic reactor. The reactor may be selected from the group consisting of Fischer-Tropsch reactors and activation reactors in which catalyst is activated prior to subsequent use as a catalyst for Fischer-Tropsch reactions. The catalyst may comprise at least one metal selected from the group consisting of iron, cobalt, and combinations thereof. In applications, the vessel is operable as a catalyst activation reactor, a catalytic reactor, or both. The method may further comprise activating the catalyst within the vessel.

In some embodiments, the loading hopper is positioned above the vessel. The catalyst loading hopper may be pressurized by nitrogen gas, natural gas, or gas considered inert for the subsequent reaction system. The loading hopper may further comprise at least one level indicator. The loading hopper may further comprise at least one pressure indicator. In embodiments, the loading hopper further comprises at least one device for controlling catalyst transfer to the vessel. In embodiments, the at least one device is selected from solenoid valves and solids flow control valves. In embodiments, the top fluid distributor comprises nozzles to direct the spray of base fluid onto the catalyst. The base fluid is preferably a liquid. In some embodiments, the vessel further comprises at least one level indicator. The at least one level indicator may be selected from the group consisting of differential pressure switches and liquid level switches. The vessel may further comprise at least one pressure indicator. In embodiments, the vessel comprises a bottom distributor comprising the at least one gas distribution nozzle. The bottom distributor may comprise a plurality of gas distribution nozzles. The vessel may further comprise at least one purge nozzle for the introduction of gas for nozzle and/or valve flushing.

The catalyst may comprise particles and a majority of the catalyst particles may have a particle size in the range of from about 1 µm to about 200 µm. In some applications, a majority of the catalyst particles have a particle size in the range of from about 10 µm to about 150 µm.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 4b is a top view of the nozzle of FIG. 4a.

FIG. 4c is a simplified top view of the nozzle of FIG. 4a.

DETAILED DESCRIPTION

Overview

Herein disclosed are a system and method of preparing catalyst slurry for activation/use by mixing catalyst with a base liquid in a vessel. The vessel may also serve as an activation reactor or as a catalytic reactor. The vessel may be operable, for example, as a catalyst activation reactor and/or a fluidized bed reactor. In other applications, the vessel is used to prepare catalyst slurry, which is then transferred to a separate reactor or reactors (for example, catalytic reactor or activation reactor) for reaction and/or activation, respectively. The disclosed system and process may be used to minimize or eliminate catalyst degradation and/or loss through a vent system, minimize personnel exposure, provide faster, more uniform mixing, or a combination thereof.

Catalyst attrition generates fines (herein defined as particles having a particle size of less than 10 microns and often less than one micron are usually considered fines in some reaction systems, like Fischer-Tropsch (FT) reactions). These fines are very difficult and costly to separate from the FT liquid products and generate operational problems with the catalyst-wax separation devices that may lead to reactor/plant shutdown producing substantial downtime and costly repairs with great economic impact. Once separated the fines are not re-used and therefore these catalyst particles are lost. The present disclosure enables elimination of mechanical devices (e.g. pumps, mechanical stirring, etc.) which are typically used and contribute to catalyst attrition.

In embodiments, the system and method of the present disclosure are used to load catalyst into main reactor or into an activation reactor. In embodiments, the system and method are used for loading catalyst into a main reactor that is a Fischer-Tropsch (FT) reactor. In alternative embodiments, the system and method of the present disclosure are used to load catalyst into an activation reactor in which catalyst is activated prior to use in a subsequent reactor. The term activation reactor is used herein to refer to reactor vessels in which chemical and/or physical transformations are performed to bring catalyst particles to a form capable of catalyzing a certain reaction. In specific embodiments, the activation reactor serves to activate catalyst for catalyzing hydrocarbon synthesis (e.g. Fischer-Tropsch) reactions In embodiments, the system and method disclosed hereinbelow are utilized to load catalyst particles, the majority of which have a particle size in the range of from about 1 μm to about 200 μm. In some embodiments, a majority of the catalyst particles have a particle size in the range of from about 10 μm to about 150 μm. In embodiments, the catalyst is a FT catalyst comprising at least one metal selected from the group consisting of iron, cobalt, and combinations thereof.

Catalyst Loading System

Figure 1:
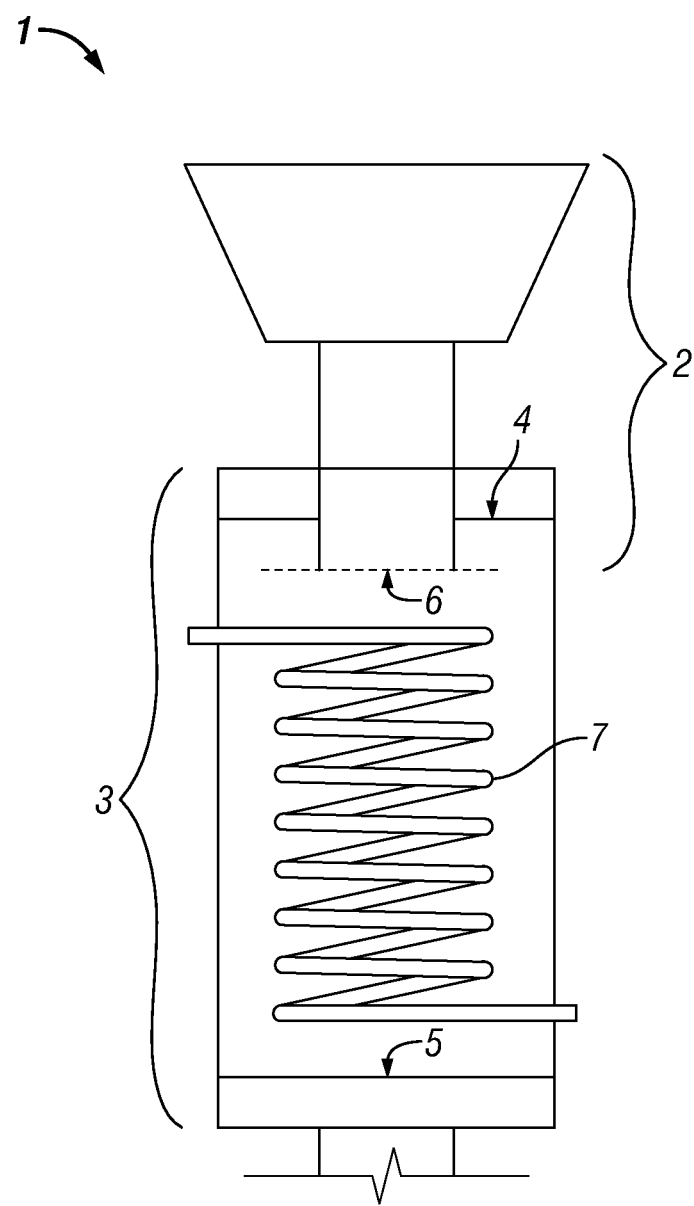
FIG. 1 is a schematic of a catalyst loading system of the present disclosure.

The catalyst loading system of the present disclosure comprises a loading vessel. In embodiments, a catalyst loading hopper is in fluid communication with the reactor loading vessel. In some embodiments, the loading hopper is located above the loading vessel. FIG. 1 is a generic drawing of a catalyst loading system of the present disclosure. Catalyst loading system 1 comprises loading hopper 2 and loading vessel 3. Loading hopper 2 and loading vessel 3 may be vertically aligned as shown in FIG. 1. Loading vessel 3 comprises a top distributor 4, which is positioned above the first point of contact 6 of catalyst entering loading vessel 3 with the contents of loading vessel 3. In embodiments, the top distributor 4 is located at or near the top of loading vessel 3. Loading vessel 3 further comprises at least one gas distribution nozzle 5. In embodiments, the at least one gas distribution nozzle 5 is part of a gas distributor located at or near the bottom of loading vessel 3. Loading vessel 3 may further comprise one or more internal or external heat transfer devices 7 for maintaining a desired temperature within the vessel.

Figure 2:
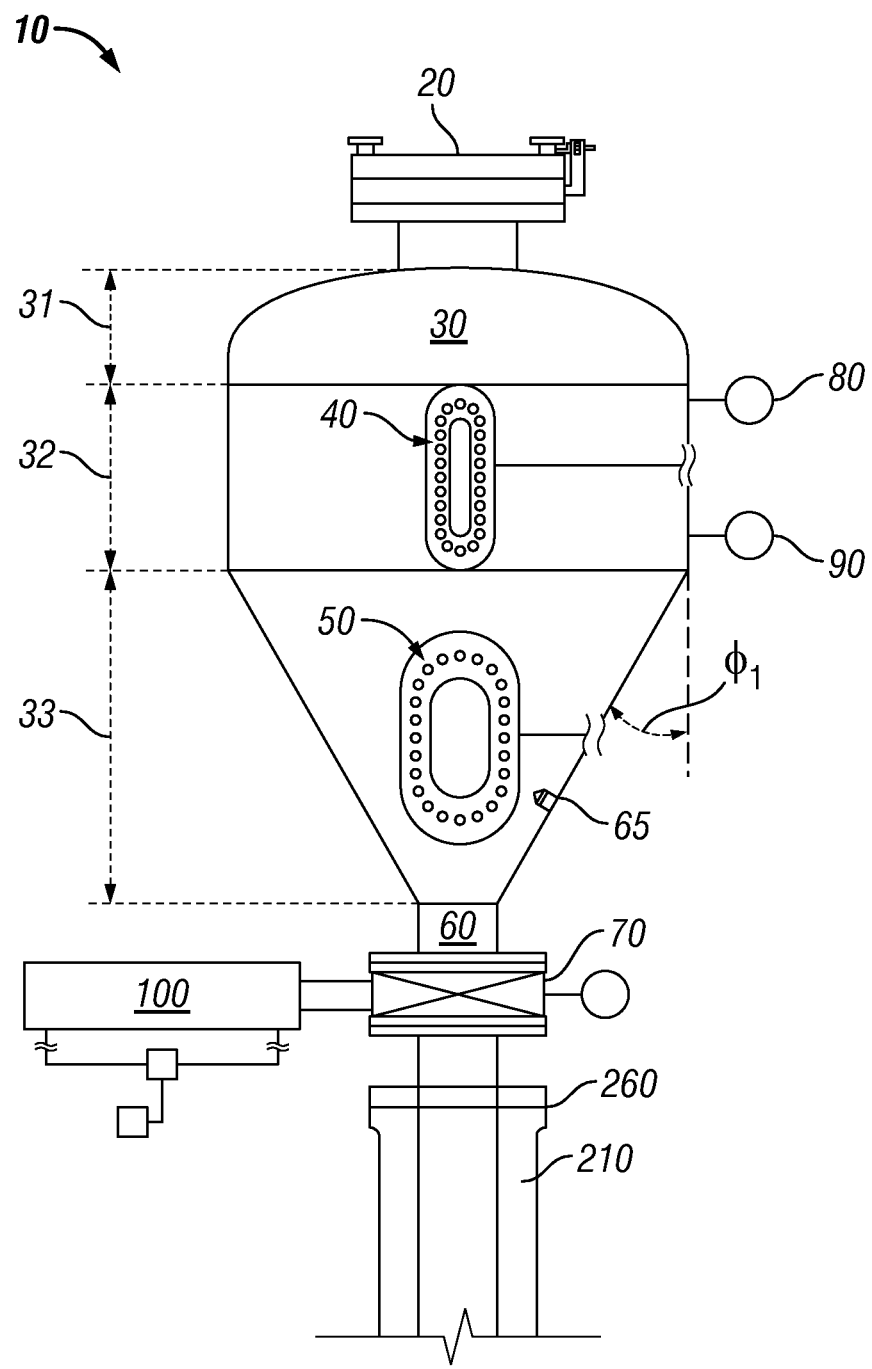
FIG. 2 is a schematic of a loading hopper according to an embodiment of the present disclosure.

FIG. 2 is a schematic of a catalyst loading hopper 10 according to an embodiment of the present disclosure. Catalyst loading hopper 10 comprises holding chamber 30 fluidly connected to exit tube 60, which is fluidly connected to a loading vessel (not shown in FIG. 2). Catalyst loading hopper 10 comprises flow control valves 70 and 80. Flow control valve 70 may be an 'on-off' type valve, such as controlled by solenoid actuator. In other embodiments, flow control valve 70 is a solids handling flow control valve that may be used to continuously control the flow rate of catalyst out of catalyst loading hopper 10. Loading hopper 10 further comprises at least one level indicator, such as, but not limited to, differential pressure switches, level switches, and observation portals. Observation portals 40 and 50 are shown in the embodiment of FIG. 2. In embodiments, catalyst loading hopper 10 further comprises at least one pressure measuring device. In embodiments, catalyst loading hopper 10 further comprises at least one gas fluidization apparatus as known to those of skill in the art, for example, gas inlet 65 to introduce air jets and insure complete catalyst transfer from loading hopper 10 to loading vessel 200. In embodiments, loading hopper 10 comprises pressure indicator 90. Gas inlets and/or nozzle(s) may be positioned in the conical section 33 and/or in the pipe 60 (110 in FIG. 3) connecting conical section 33 to the loading vessel 200 or to flow valve 70 on top of the loading vessel 200.

Transfer of catalyst material from the loading hopper 2 (FIG. 1) to the loading vessel 3 (FIG. 1) may be effected by pressurization of loading hopper 2, by gravity, or by a combination thereof. When the pressure of loading hopper 2 is greater than the pressure of loading vessel 3, pressure differential may be used to transfer the contents of loading hopper 2 into loading vessel 3. Alternatively, transfer of materials from loading hopper 2 to loading vessel 3 may be gravity driven.

By way of non-limiting example, in specific embodiments loading hopper 10 comprises a top section 31 which may be rounded as in FIG. 2, vertical walled middle section 32, and frustoconical lower section 33 designed as shown in FIG. 2. In specific embodiments, the ratio of the heights of top section 31 to middle section 32 to bottom section 33 of loading hopper 10 may be about 6:9:17, or about 6.0:9.5:17.3.

The angle $\theta_1$ of the conical section (slope of section with respect to the vertical plane) of loading hopper 2 is selected such that all materials flow out of loading hopper 2. Angle $\theta_1$ is catalyst specific and can be determined for each type of catalyst based on solid flow properties. Angle $\theta_1$ may be in the range of from 10 degrees to 45 degrees. In a specific embodiment, as discussed in Example 1, angle $\theta_1$ is about 18 degrees.

Catalyst loading hopper 10 may be adapted such that at least a portion thereof may be pulsed and/or vibrated. At least a portion of the catalyst loading hopper 10 may be pulsed and/or vibrated continuously or periodically. Pulsing and/or vibration may be effected by an external mechanical vibrator positioned on the catalyst loading hopper 10. Such pulsing and/or vibration may be used to minimize and/or eliminate catalyst bridging within loading hopper exit tube 60. As shown in FIG. 2, for example, solenoid actuator 100 may be used to periodically pulse a portion of hopper exit tube 60.

FIG. 3 is a schematic of a loading vessel 200 according to an embodiment of the present disclosure. Loading vessel 200 comprises top distributor 310, bottom distributor 370, liquid/slurry discharge port 220, catalyst loading pipe 110 and loading vessel body 210. In FIG. 3, loading vessel body 210 is attached at one end to raised face neck weld 260 and at the other end to raised face neck weld 510.

In embodiments, top distributor 310 is located at or near the top of the loading vessel whereby catalyst is wetted during initial loading via wetting nozzle 300. Wetting nozzle 300 may be a flange nozzle (not depicted in FIG. 3).

Distributor 310 may be any type of distributor known to one of skill in the art. FIG. 3b is a schematic of a top distributor 310 according to an embodiment of the present disclosure. In embodiments, top distributor 310 is a liquid distributor. Top distributor 310 comprises distributor 490, fluid (e.g. liquid) nozzle ports 485, and fluid inlet 390. In embodiments, top distributor 310 comprises a single nozzle. In embodiments, top distributor 310 comprises a plurality of nozzles. In specific embodiments, top distributor 310 comprises 8 nozzles. In embodiments, top distributor 310 is annularly shaped. In embodiments, top distributor 310 is annular and comprises eight nozzles positioned equidistantly around the annulus.

Loading vessel 200 may further comprise at least one level indicator. Suitable level indicators include, but are not limited to, level switches and differential pressure switches. In the embodiment of FIG. 3, loading vessel 200 comprises differential pressure (Delta P) indicators 330, 340 and 345. In the embodiment of FIG. 3, loading vessel 200 comprises level switches 350 and 360.

In the embodiment of catalyst loading vessel 200 of FIG. 3, bottom distributor 370 is located at or near the bottom of loading vessel 200 for mixing and fluidization of catalyst and media with minimal degradation. Bottom distributor 370 may be any suitable distributor known in the art. A unique bottom distributor 370 comprises gas distributor outlet holes 385 arranged for the purpose of minimization of catalyst attrition. Fluid distributor inlet 240 is used to introduce fluid to bottom distributor 370 via connection to gas inlet port 245. In embodiments, bottom distributor 370 is a gas distributor. In embodiments, bottom distributor 370 is a nitrogen or natural gas or inert gas distributor. In embodiments, bottom distributor 370 comprises at least one nozzle. In embodiments, bottom distributor 370 comprises a plurality of nozzles. The number of nozzles will vary depending on the size of loading vessel 200. In embodiments, bottom distributor 370 comprises 8 nozzles; in alternative embodiments, bottom distributor 370 comprises 12 nozzles. The gas distribution nozzles may be any nozzles known in the art. In embodiments, the gas distribution nozzles are low attrition nozzles, as further discussed hereinbelow and in FIG. 4. The gas distribution nozzle(s) aid in catalyst fluidization.

Bottom distributor 370 may be any suitable distributor known to those of skill in the art. FIG. 3c is a schematic of a bottom distributor 370 according to an embodiment of the present disclosure. In embodiments, bottom distributor 370 comprises outer distributor 375 and inner distributor 380. In embodiments, outer distributor 375 is annularly shaped. In embodiments, inner distributor 380 is annularly shaped. In other embodiments, inner distributor is not annularly shaped. In embodiments, outer distributor 375 is annular and comprises eight gas outlets positioned equidistantly around the annulus.

The nozzle size and number of nozzles are such that the velocity of the gas in contact with the catalyst particles minimizes catalyst attrition. The design criteria of velocity of the gas in contact with the catalyst particles as the gas exits the nozzles will depend on the attrition resistance of the catalyst particles.

Figure 4A:
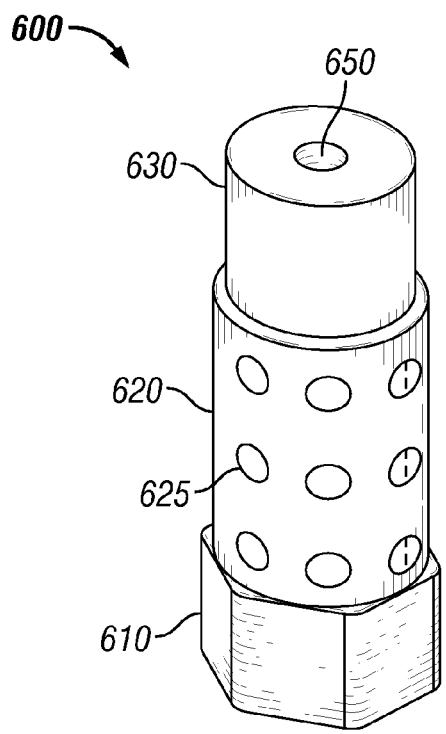
FIG. 4a is a schematic of low attrition nozzle according to an embodiment of the present disclosure.
Figure 4B:
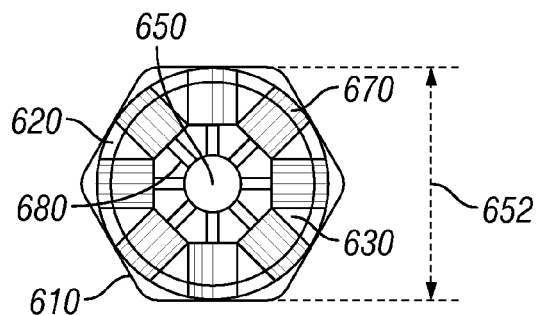
Figure 4C:
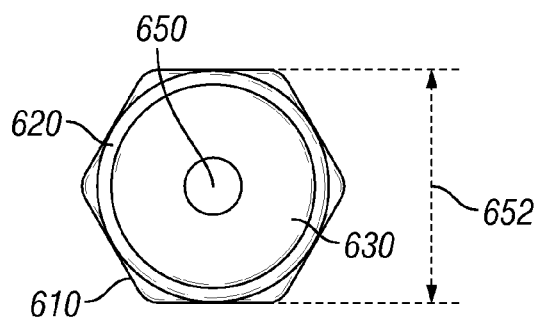

The nozzles may be any suitable nozzles known in the art. FIG. 4 is a schematic of a design for a nozzle 600 which may provide reduced catalyst attrition. In this embodiment, fluid enters the nozzle 600 via nozzle inlet 650, and exits nozzle 600 via nozzle outlets 625 arranged concentrically over the exposed central portion 620 of nozzle 600. In the embodiments of FIG. 4, nozzle 600 comprises 3 rows of nozzle outlets 625 arranged in concentric rings of 8 nozzle outlets around the circumference of exposed central portion 620 of nozzle 600. In embodiments, nozzle 600 has a diameter 652 of exposed central portion 620 to length ratio of 1:2⅓. In embodiments, end portion 630 of nozzle 600 comprises an NPT (National Pipe Thread) such that it may be securely affixed to gas distributor outlet holes 385. In embodiments, each outlet hole 385 of inner distributor 380 and outer distributor 375 of bottom distributor 370 is attached to an end portion 630 of a low attrition nozzle 600. Nozzle 600 may comprise exposed ends 610.

The gas fed to bottom distributor 370 in the bottom 500 of loading vessel 200 gets distributed to each nozzle 600 through nozzle inlet 650. From the nozzle inlet 650 the gas is distributed through inner orifices 680. The size of these inner orifices 680 is such as to induce enough pressure drop in the gas stream so that the gas gets distributed evenly among all inner orifices and at the same time this pressure drop prevents catalyst particles and/or liquid from penetrating inside the nozzle 600 and plugging the nozzles. From the inner orifices 680 the gas flows into loading vessel 200 through outer orifices 670. The size of the outer orifices 670 must result in a gas velocity out of outer orifices 670 at or below a maximum acceptable velocity based on the attrition resistance of the particular catalyst in loading vessel 200 and the total gas feed rate into distributor 370. The design for distributor 370 and nozzles 600 ensures that gas is evenly distributed among all nozzles 600 and that the gas jets out of the nozzles 600 have minimum or substantially no impact on the physical integrity of the catalyst.

In embodiments, loading vessel 200 comprises at least one gas purge nozzle 230 to facilitate nozzle and/or valve purging/flushing. In embodiments, the at least one gas purge nozzle 230 is located at or near the liquid discharge port 220. In embodiments, nitrogen gas (or natural gas or inert gas) is used to purge the nozzles(s). In embodiments, the liquid discharge port is located at or near the bottom 500 of loading vessel 200.

Figure 3A:
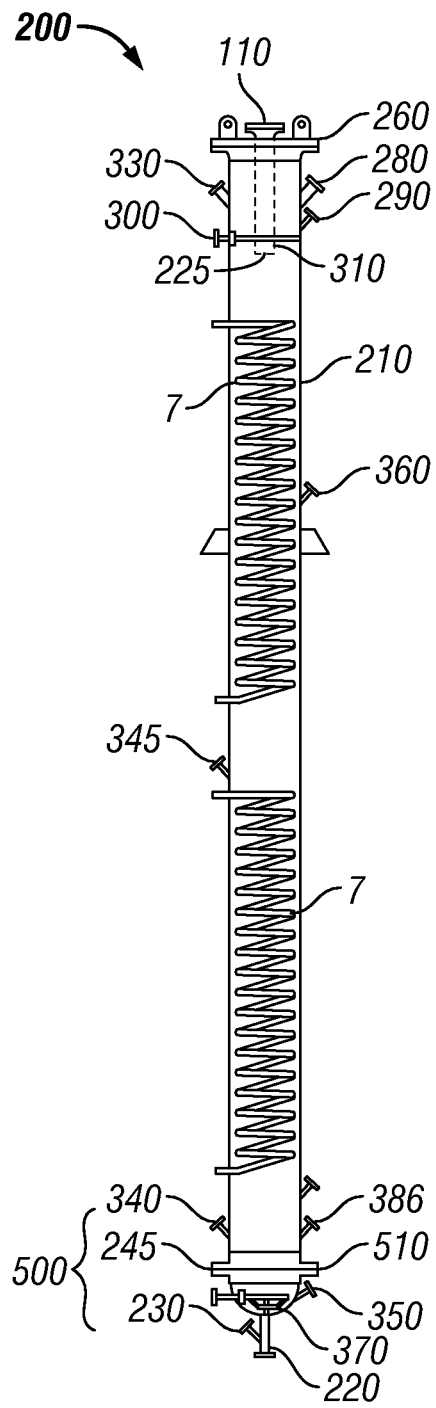
FIG. 3a is a schematic of a loading vessel according to an embodiment of the present disclosure.
Figure 3B:
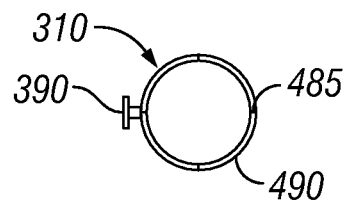
FIG. 3b is a schematic of a top distributor of a loading vessel according to an embodiment of the present disclosure.
Figure 3C:
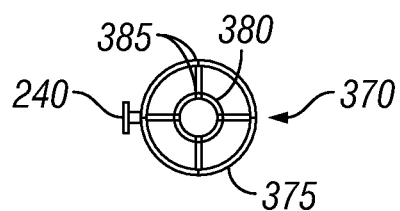
FIG. 3c is a schematic of a suitable bottom distributor according to an embodiment of the present disclosure.
Figure 3D:
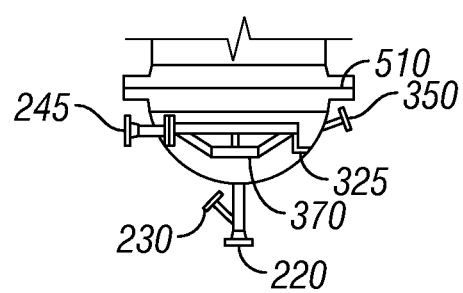
FIG. 3d is a schematic of the profile of the bottom distributor in FIG. 3c.

FIG. 3d is a schematic of the profile of the bottom 500 of loading vessel 200 of FIG. 3a. Bottom 500 of loading vessel 200 comprises bottom distributor 370, gas (e.g., nitrogen gas) purge 230, gas inlet port (e.g., nitrogen gas inlet port) 245, loading vessel body 210, raised face weld neck (RFWN) 510, level switch 350, and liquid/slurry discharge port 220. Bottom distributor 370 may be supported by any means known to those of skill in the art. For example, bottom distributor 370 may be supported with support clip 325.

Figure 5:
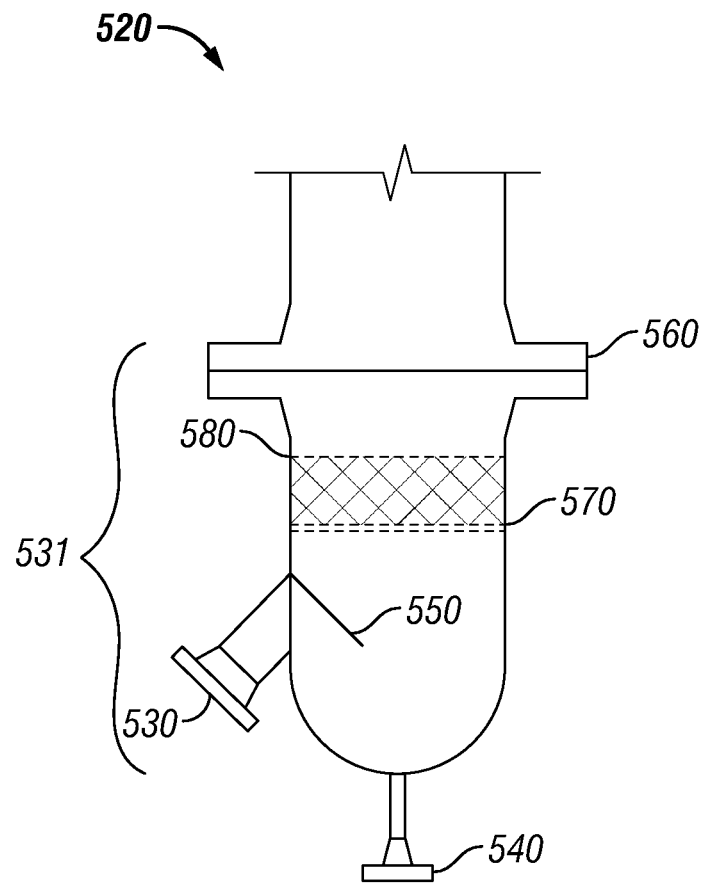
FIG. 5 is a schematic of a knock out pot.

Catalyst loading vessel 200 may further comprise knock out pot 520 (see FIG. 5) which is attached to knock out pot vent (loading vessel vent) 280, which may be located at or near the top of loading vessel 200. Knock out pot 520 may serve to remove any entrained catalyst/liquid (slurry) from the vent gas. Knock out pot 520 may comprise knock out pot inlet 530, recovered catalyst outlet 540, stainless steel demister pad 580, perforated plate 570, flange 560, and baffle plate 550. Baffle plate 550 may serve to cause catalyst particles to fall to catalyst outlet 540. In specific embodiments, the length 531 of knock out pot 520 may be about 2 feet.

Loading vessel 200 may further comprise at least one pressure gauge, for example, pressure gauge 386 in the embodiment of FIG. 3. Loading vessel 200 may further comprise high pressure gas inlet 290 for introducing high pressure gas (e.g. nitrogen) which may be used to flush any remaining catalyst/liquid from the loading vessel 200 to the main reactor.

In embodiments in which the base liquid is a solid at room temperature, loading vessel 200 and/or catalyst loading hopper 10 may comprise an internal or external heating means, 7. The heating means may be any means known in the art; for example, internal heating means may comprise boiler feed water (BFW)/steam coils similar to those commonly utilized in Fischer-Tropsch reactors or hot oil fluid coils rather than BFW/steam. Heating or cooling medium (e.g., boiler feed water and/or steam) may be circulated through, for example, the coils of an internal heat transfer device at a pressure and temperature desired for catalyst mixing, catalyst activation or both. Exemplary external heating means may comprise a recirculation pump and a heat exchanger.

Although referred to as a "loading vessel," loading vessel (3 in FIG. 1 and 200 in FIG. 3) may serve as a loading vessel from which prepared catalyst slurry is subsequently transferred to a distinct reactor in which catalyst activation, reaction, or both are carried out, or the loading vessel may be adapted for in situ catalyst activation and/or catalytic reaction. In embodiments, therefore, "loading vessel" 3 (200 in FIG. 3) may be operable as a loading vessel in which catalyst slurry is held and/or prepared (mixed with base liquid, fluidized with gas), an activation reactor in which catalyst is activated prior to use as catalyst, and/or a catalytic reactor in which catalytic reaction is carried out to produce a desired product. In an application, the loading vessel may be used to load catalyst and liquid, mix the catalyst with base liquid and optionally fluidize the slurry with a gas. The prepared catalyst slurry may subsequently be transferred to one or more distinct catalytic reactors (e.g., a Fischer-Tropsch reactor or reactors). Alternatively, the prepared catalyst slurry from the loading vessel may be transferred to one or more reactors adapted for operation as activation reactor(s). Activated catalyst may subsequently be transferred from the activation reactor(s) to one or more catalytic reactors.

In other applications, the loading vessel itself may be adapted for use as an activation reactor. In such applications, the loading vessel may comprise internal and/or external temperature control apparatus (e.g., cooling coils/tubes, heat exchangers, etc.), apparatus for feeding reactant (e.g., synthesis gas) into the vessel, overhead cooling/condensing equipment for cooling and condensing overhead vapor product(s), etc. In such instances, the catalyst loading vessel is operable as an activation reactor, wherein mixing of un-activated catalyst and base liquid occurs as well as subsequent in situ activation of the catalyst. Catalyst prepared and activated in the loading vessel may subsequently be transferred to one or more reactors for use. For example, Fischer-Tropsch catalyst loaded and activated via loading vessel 3 (or 200 in FIG. 3) may be introduced into one or more Fischer-Tropsch reactors for the conversion of synthesis gas into desired hydrocarbons.

Catalyst Loading Method

The catalyst loading method of the present disclosure may be utilized to prepare catalyst slurry for subsequent use by combining the catalyst with a base liquid carrier in a loading vessel and optionally fluidizing the slurry with a gas. As discussed hereinabove, in certain applications the vessel is also used to activate the prepared catalyst in situ. Prepared slurry or activated catalyst may be transferred from the loading vessel to one or more subsequent activation reactors or catalytic reactors respectively.

In embodiments, a base liquid is loaded into loading vessel 200 wherein catalyst transfer and/or mixing occurs prior to introduction of the catalyst to a reactor (not shown). This base liquid may be any liquid that can be considered inert in the Fischer-Tropsch reactor, i.e. not harmful to the catalyst during activation or reaction. The base liquid may be liquid or solid at ambient temperature. For example, the base liquid may be formed by heating a solid to a temperature at which it becomes liquid. For instance base liquid can be formed from Fischer-Tropsch wax. The Fischer-Tropsch wax may be heated and maintained at a temperature in the range of from about 176.7° C. (350° F.) and 232.2° C. (450° F.) to maintain the base wax liquid in an easily "flow-able" (relatively low viscosity) state. In embodiments in which the base liquid is a solid at room temperature, loading vessel 200 and/or catalyst loading hopper 10 may comprise an internal or external heating means. The heating means may be any means known in the art, for example, internal heating means may comprise boiler feed water (BFW)/steam coils similar to those commonly utilized in Fischer-Tropsch reactors or hot oil fluid coils rather than BFW/steam. External heating means may comprise a recirculation pump and a heat exchanger. In embodiments, the base liquid comprises paraffinic hydrocarbons.

In embodiments, catalyst is loaded into loading hopper 10 via loading hopper inlet 20 before pressurized introduction to catalyst loading vessel 200. Gas (e.g., nitrogen) introduction into the loading hopper 10 and/or a vibration means are used to effect the transfer the solid catalyst particles from loading hopper 10 to loading vessel 200. Gas introduction into loading vessel 200 helps to maintain the catalyst in suspension; avoid/ameliorate slumping in the bottom of the vessel and plugging of gas nozzles; and minimize catalyst attrition before introduction of catalyst to the reactor.

In embodiments, the method comprises introducing base liquid into loading vessel 200. This base liquid may comprise paraffinic hydrocarbons. Mixing and fluidization of the contents of loading vessel 200 is provided by bubbling gas, from the bottom 500 of the loading vessel 200 via gas inlet port 245 and bottom distributor 370. In embodiments, the gas is an inert gas. In some embodiments, the gas comprises nitrogen. Gas distribution nozzles are designed to minimize catalyst degradation and/or attrition.

In some embodiments of the method, catalyst is introduced into loading hopper 10 which may be positioned above, or near the top of loading vessel 200. Catalyst loading hopper 10 is pressurized to a point that exceeds the pressure of reactor loading vessel 200. Catalyst hopper 10 may be pressurized by, for example, gas via gas inlet 65 (e.g., nitrogen gas nozzle). The increase in pressure of loading hopper 10 pushes the catalyst into reactor loading vessel 200. During transfer of catalyst from loading hopper 10 to loading vessel 200, pulsing and/or vibration at periodic intervals (for example, via solenoid actuator 100) may be used to minimize and/or eliminate catalyst bridging within loading hopper exit tube 60.

During initial transfer of catalyst from catalyst loading hopper 10 to loading vessel 200, base liquid is distributed via top distributor 310. Upon reaching the end of exit tube 60, catalyst is wetted upon introduction into loading vessel 200 at first contact point 225 of catalyst entering loading vessel 200 with contents of loading vessel 200 (contact point 6 in FIG. 1). Fluid distribution via top distributor 310 is above catalyst entry point (first contact point) 225; this enhances fluid and catalyst mixing and prevents catalyst particles from being carried away with inert gas through the loading vessel vent(s) 280. Within loading vessel 200, mixing of catalyst with base fluid is effected prior to introduction of the catalyst slurry to the main reactor (not shown in FIG. 3) via loading vessel liquid discharge switch (not shown) and liquid discharge port 220.

As the catalyst transfer proceeds, base fluid may be sprayed through fluid nozzle ports 485 located at or above the catalyst introduction point 225, thereby wetting the catalyst. The catalyst wetting makes it heavier, thereby eliminating, preventing, or minimizing the loss of catalyst through the loading vessel vent system, for example through KO (knock out) pot vent 280.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method of preparing catalyst slurry, the method comprising:
   providing a cylindrical vessel comprising at least one gas distribution nozzle at or near the bottom of the vessel, an annular top fluid distributor located at or near the top of the vessel, a catalyst inlet through which catalyst is introduced into the vessel, a first contact point at which catalyst introduced into the vessel first contacts the contents of the vessel, and a discharge outlet whereby catalyst slurry exits the vessel, wherein the top fluid distributor is located within the vessel at or above the first contact point, and comprises a distribution ring comprising a plurality of nozzles positioned therearound;
   providing a loading hopper, the loading hopper comprising a loading hopper exit in fluid communication with the catalyst inlet of the vessel, and at least one gas inlet whereby the loading hopper may be pressurized;
   introducing catalyst into the loading hopper; and
   transferring the catalyst into the vessel via the loading hopper exit and the catalyst inlet by pressurizing the loading hopper to a pressure greater than the pressure of the vessel, by gravity, or by a combination thereof, without utilizing a pump between the loading hopper and the vessel, while spraying, via the top fluid distributor, a base fluid onto the catalyst being transferred into the vessel, whereby the catalyst is wetted with the base fluid.

2. The method of claim 1 wherein the base fluid is a liquid at room temperature or wherein the base fluid is a solid at room temperature and the vessel further comprises temperature control apparatus whereby the base fluid is maintained in a flowable form within the vessel.

3. The method of claim 1 wherein the top fluid distributor comprises a plurality of nozzles positioned equidistantly around the distribution ring to direct the spray of base fluid onto the catalyst being transferred.

4. The method of claim 1 further comprising extracting the catalyst slurry from the vessel via the catalyst slurry discharge outlet, and transferring same to a reactor.

5. The method of claim 4 wherein the reactor is a fluidized bed catalytic reactor.

6. The method of claim 5 wherein the reactor is selected from the group consisting of Fischer-Tropsch reactors and activation reactors in which catalyst is activated prior to subsequent use as a catalyst for Fischer-Tropsch reactions.

7. The method of claim 6 wherein the catalyst comprises at least one metal selected from the group consisting of iron, cobalt, and combinations thereof.

8. The method of claim 1 further comprising mixing the vessel contents by introducing gas via the at least one gas distribution nozzle.

9. The method of claim 8 further comprising spraying the mixed catalyst slurry with base fluid via the top distributor during transfer of catalyst from the vessel to a reactor.

10. The method of claim 1 wherein the vessel is operable as a catalyst activation reactor, a catalytic reactor, or both.

11. The method of claim 10 further comprising activating the catalyst within the vessel.

12. The method of claim 1 wherein the loading hopper is centered above the vessel.

13. The method of claim 1 wherein the catalyst loading hopper is pressurized by nitrogen gas.

14. The method of claim 1 wherein the loading hopper further comprises at least one level indicator.

15. The method of claim 1 wherein the loading hopper further comprises at least one pressure indicator.

16. The method of claim 1 wherein the loading hopper further comprises at least one device for controlling catalyst transfer to the vessel.

17. The method of claim 16 wherein the at least one device is selected from solenoid valves and solids flow control valves directly connected with the loading hopper.

18. The method of claim 1 wherein the vessel further comprises at least one level indicator.

19. The method of claim 1 wherein the vessel further comprises at least one pressure indicator.

20. The method of claim 19 wherein the bottom distributor comprises one or more rings, each ring comprising a plurality of gas distribution nozzles.

21. The method of claim 1 further comprising an annular bottom distributor comprising the at least one gas distribution nozzle.

22. The method of claim 1 wherein the vessel further comprises at least one purge nozzle for the introduction of gas for nozzle and/or valve flushing.

23. The method of claim 1 wherein the catalyst comprises particles and a majority of the catalyst particles have a particle size in the range of from about 1 µm to about 200 µm.

24. The method of claim 23 wherein a majority of the catalyst particles have a particle size in the range of from about 10 µm to about 150 µm.

25. The method of claim 1 wherein slurry is extracted from the bottom of the vessel via the catalyst slurry discharge outlet.

26. The method of claim 1 wherein the catalyst is introduced into the loading hopper as a solid feed.

27. The method of claim 26 wherein the solid feed consists essentially of the catalyst.

28. The method of claim 1 wherein the loading hopper comprises a frustoconical lower section, and selecting an angle of the walls of the frustoconical lower section to promote flow of solid catalyst therethrough.

29. The method of claim 1 further comprising subjecting the loading hopper to pulsing, vibrating, or both, continuously or intermittently, to promote flow of solid catalyst out of the loading hopper.

* * * * *